United States Patent [19]

Regan

[11] Patent Number: 4,641,841
[45] Date of Patent: Feb. 10, 1987

[54] METAL SEAL FOR A TUBULAR CONNECTION

[75] Inventor: Albert M. Regan, Huntington Beach, Calif.

[73] Assignee: Hughes Tool Company, Houston, Tex.

[21] Appl. No.: 769,051

[22] Filed: Aug. 26, 1985

[51] Int. Cl.⁴ .................. E21B 33/03; F16J 15/00; F16J 15/32
[52] U.S. Cl. ........................ 277/30; 166/84; 277/152; 277/212 C; 277/236; 285/917
[58] Field of Search ............ 277/236, 212 C, 152, 277/30; 92/246, 242; 166/387, 84, 87, 88, 127, 86; 285/110, 917

[56] References Cited

U.S. PATENT DOCUMENTS

| | | | |
|---|---|---|---|
| 1,020,836 | 3/1912 | Moore | 92/246 X |
| 1,224,999 | 5/1917 | Barthel | 92/246 X |
| 2,405,152 | 8/1946 | Kilchenmann | . |
| 3,159,302 | 12/1964 | Latham et al. | . |
| 3,422,902 | 1/1969 | Bouchillon | 277/212 C X |
| 4,315,543 | 2/1982 | Luers | 277/212 C X |
| 4,333,526 | 6/1982 | Watkins | 166/88 X |
| 4,353,560 | 10/1982 | Tohill | . |
| 4,473,230 | 9/1984 | Adamek | 285/917 X |
| 4,476,934 | 10/1984 | Regan | . |

FOREIGN PATENT DOCUMENTS 494552 10/1938 United Kingdom .................. 92/246

*Primary Examiner*—Allan N. Shoap
*Attorney, Agent, or Firm*—James E. Bradley

[57] ABSTRACT

A metal seal for sealing the male end of a tube into the female end of another tube, particularly in a subsea well installation. An annular metal lip is located on the exterior of the male end of the tube. The lip has a free end with a radially protruding metal band. The band has an outer diameter greater than the inner diameter of the female tube bore, providing an interference fit. An annular recess is located inward from the lip, allowing the lip to deflect and exposing the inner portions of the lip to pressure in the bore to act outwardly on the lip.

2 Claims, 3 Drawing Figures

METAL SEAL FOR A TUBULAR CONNECTION

BACKGROUND OF THE INVENTION

1. Field of the Invention

This invention relates in general to subsea well assemblies, and in particular to a metal seal for a tubular connection, such as a stinger in a subsea wellhead.

2. Description of the Prior Art

In subsea well installations, there are instances where tubes interconnect telescopingly but stationarily and provide sealing against high pressure for a long duration. One instance would be a stinger, which is a tube that has a lower end that inserts into a female end or bore of a lower tubular member. The upper end is secured to an upper tubular member. The upper member may be a Christmas tree assembly, and the lower tubular member might be a tubing hanger which is connected to tubing extending into the well. Normally, elastomeric seals are located on the lower end of the stinger for sealing against the bore of the lower tubular member.

The seals must withstand high pressure, and in some cases may be located in place for several years. There is some danger of deterioration and leakage with time. Also, some chemicals may damage elastomeric seals. Metal seals are used at times in various places of the subsea wellhead in place of elastomeric seals, or used with elastomeric seals as a backup. Normally these metal seals require two sealing surfaces. There are also other applications currently using elastomeric seals that preferably could be replaced with metal seals of an improved design.

SUMMARY OF THE INVENTION

In this invention, the tube, which could be a stinger, has an annular metal lip located on the exterior near one end. The lip has a free end with a radially protruding metal band. The band has an outer diameter that is slightly greater than the inner diameter of the bore, providing an interference fit. An annular recess is located radially inward from the lip. The recess allows the lip to deflect slightly when the tube is inserted into the female bore. Also, the recess exposes the inner surface of the lip to the high pressure in the bore, which acts outwardly on the lip to enhance sealing.

DESCRIPTION OF THE PREFERRED EMBODIMENT

Figure 1:
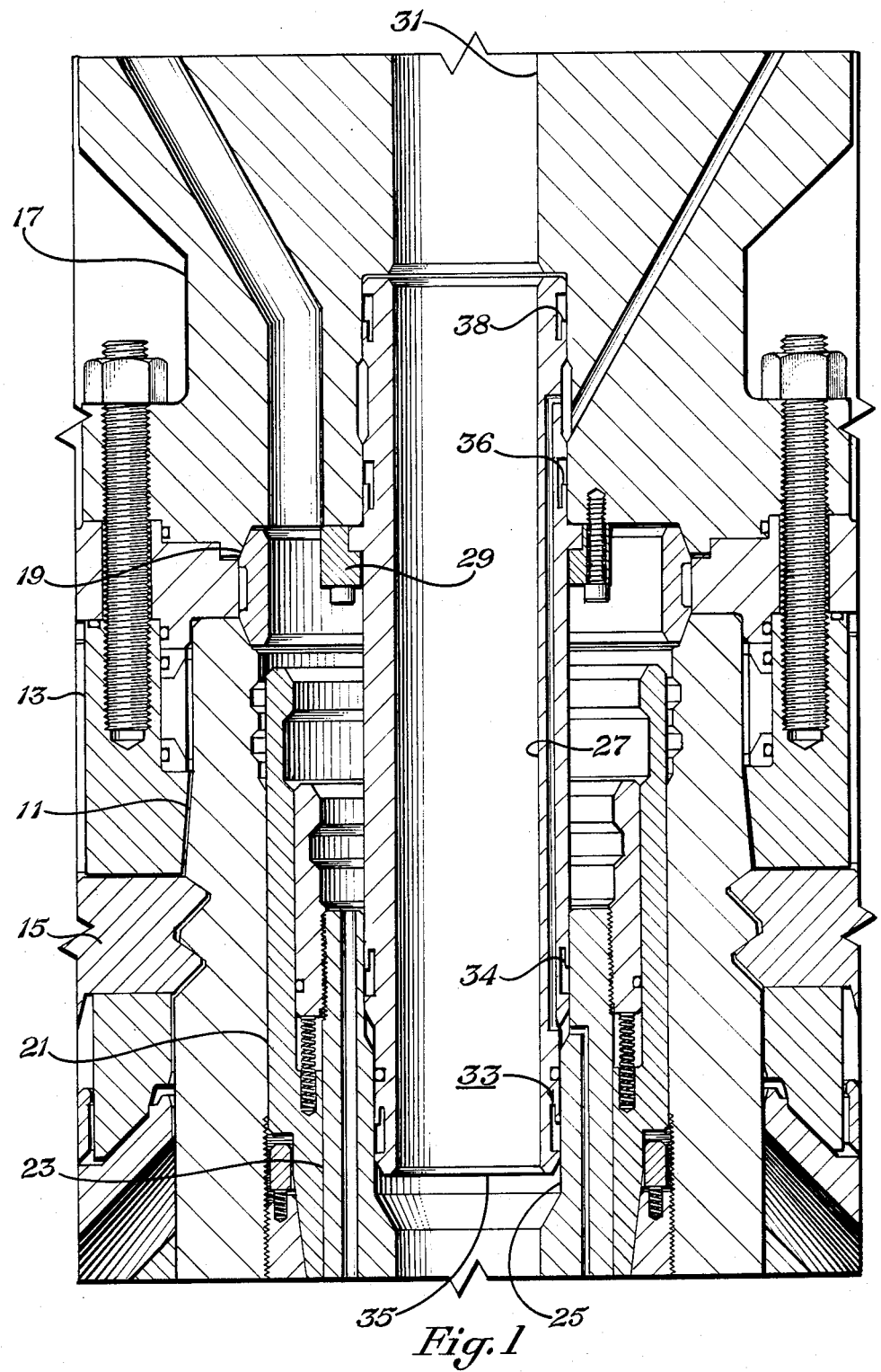
FIG. 1 is a vertical sectional view showing a stinger located between a Christmas tree assembly and a tubing hanger, the stinger having a metal seal constructed in accordance with this invention.

Referring to FIG. 1, the components are conventional, except for the seal on the stinger and will not be described in detail. Briefly, the subsea wellhead assembly includes a wellhead 11 located on the sea floor. The wellhead connector 13 is mounted over the wellhead 11. The connector 13 is secured by dogs 15 to the wellhead 11 in a conventional manner. The Christmas tree assembly 17 is mounted to the top of the connector 13 and extends upwardly. A metal seal 19 of conventional nature is located between the upper end of the wellhead 11 and the lower end of the Christmas tree assembly 17.

A tubing hanger 21 is mounted inside the wellhead 11. A tubular member 23, which forms a part of the tubing hanger 21, is located inside. Tubular member 23 has a bore 25. A stinger 27 is rigidly mounted to the lower end of the Christmas tree assembly 17 by a retainer 29. The upper end of the stinger 27 extends into a bore 31 of the Christmas tree assembly 17. The lower end of the stinger 27 is inserted into the bore 25 of the tubular member 23 when the Christmas tree assembly 17 is lowered over the wellhead 11.

A seal 33 is located a short distance above the lower end 35 of the stinger 27. A metal seal 34 of the same structure, but slightly larger diameter is located above metal seal 33, and also seals in bore 25. In addition, there are two metal seals 36 and 38 of similar structure that are received within bore 31. The metal seals 34, 36 and 38 will not be described in detail because of the similarity in structure to seal 33.

Figure 2:
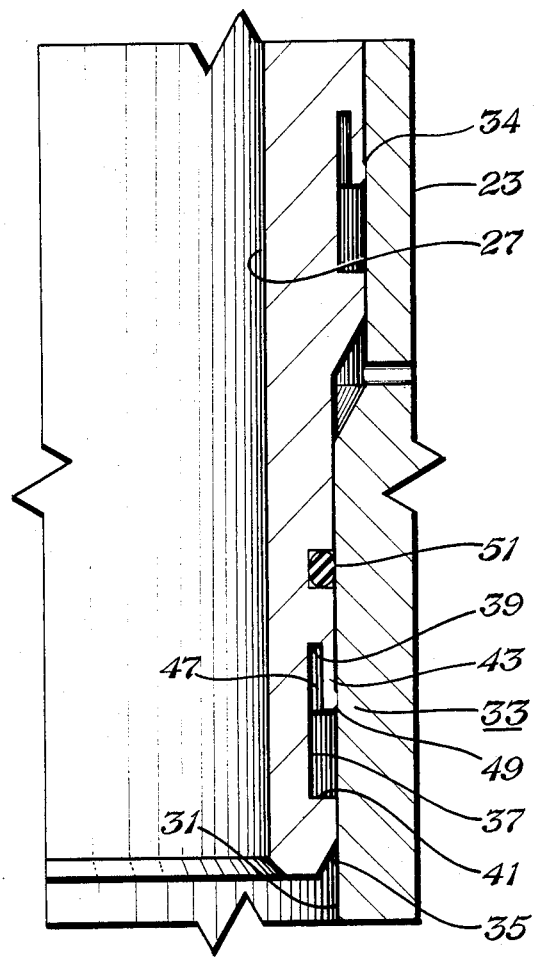
FIG. 2 is a partial, enlarged vertical sectional view of the metal seal of the stinger of FIG. 1.

Referring to FIG. 2, which shows seal 33 in more detail, the lower end 35 has an outer diameter that is only slightly less than the inner diameter of bore 25, however, it does not perform sealing. The lower end 35 is an insertion end and is frusto-conical or bevelled. An annular recess 37 is formed in the sidewall of the stinger 27 above the lower end 35. Recess 37, in cross-section, is generally rectangular, having upper and lower shoulders 39 and 41, which face each other and are located in planes perpendicular to the axis of the stinger 27. Shoulder 41 is located a short distance above lower end 35 and has an outer diameter only slightly less than the bore 25. A lip 43 depends downwardly from the upper shoulder 39. Lip 43 is a cylindrical member that has an outer sidewall that is only slightly less in diameter than the inner diameter of the bore 25 for a close sliding fit and is substantially the same diameter as the outer diameter of shoulder 41. Lip 43 has an inner sidewall 47, that is concentric with the outer sidewall 45, and also with the cylindrical surface of the recess 37. The inner sidewall 47 is spaced from the sidewall of recess 37 by a distance that is approximately equal to the cross-sectional thickness of the lip 43.

Figure 3:
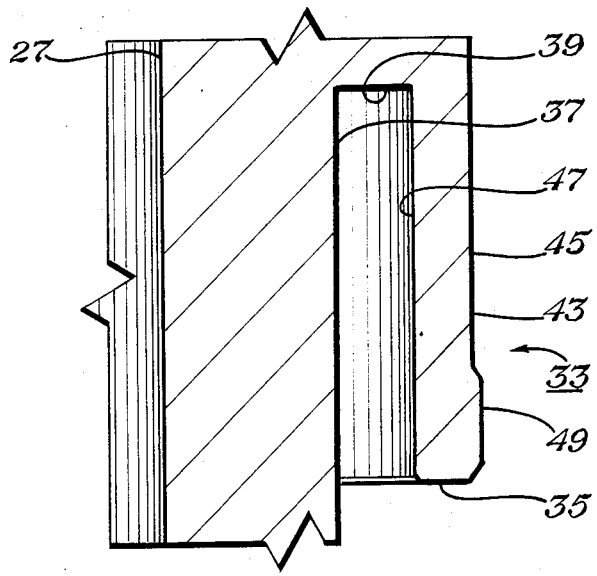
FIG. 3 is a further enlarged view of part of the metal seal of the stinger of FIG. 1.

An integral annular band 49 is formed on the sidewall 45 of the lip 43 at the lower end of the lip, as shown in FIG. 3. The lower end of lip 43 is spaced above shoulder 41 a short distance. Band 49 is coated with an annular deposit of a softer metal than the lip 43 for lubrication. Lip 43 will be integral with the stinger 27, and thus will normally be of steel. The coating is preferably of cadmium and is about 0.0005 inches thick. The radial thickness of the band 49 is preferably about 0.007 inch. This results in an interference fit with the bore 25. For example, in a bore 25 of 5.125 inch diameter, the outer diameter of the band 49 is preferably about 5.137 inch. The cadmium is deposited on the lip 43 in a conventional manner. In the prior art, cadmium has been deposited on the metal seal 19 (FIG. 1) for lubrication to enhance sealing, and the same technique may be used herein to apply the cadmium. Seals 34, 36 and 38 are constructed in the same manner and will not be described in further detail.

In operation, when the Christmas tree assembly 17 is lowered onto the wellhead 11, the stinger 27 will insert into the bore 25. The lip 43 will deflect inwardly a slight amount as it enters the bore 25. The deflection is not enough to permanently deform the lip 43, rather the deflection is within the elastic limits of the lip 43. Some of the cadmium coating on band 49 will deposit on the bore 25 as the stinger 27 is inserted, forming smooth sealing surfaces. Once the pressure is applied to the bore 25 and bore 31, the fluid will enter the recess 37 and act outwardly on the inner sidewall 47 of the lip 43. This pressure will press the lip 43 against the bore 25 for a tighter seal.

The invention has significant advantages. The metal seal needs only one sealing surface to seal against. The seal, being an integral part of the tube, does not require a retaining ring. This allows several seals of different diameters to be placed on the same tube and backed up with elastomeric seals.

While the invention has been shown in only one of its forms, it should be apparent to those skilled in the art that it is not so limited but is susceptible to various changes without departing from the scope of the invention.

I claim:

1. In a subsea well installation having first and second tubes, the first tube having a male end adapted to seat into a bore of the second tube, to establish fluid communication, an improved seal means on the male end of the first tube, comprising in combination:
   an annular recess formed in the sidewall of the first tube, defining a support shoulder;
   a cylindrical metal lip depending from the support shoulder, having an inner sidewall spaced from the sidewall of the first tube, the lip having a free end with an outer diameter that is slightly less than the inner diameter of the bore of the second tube; and
   an annular band formed on the exterior of the free end of the lip, the band having an outer diameter that is greater than the inner diameter of the bore so as to form an interference fit with the bore, causing the lip to deflect elastically inward when inserted within the bore;
   the recess being adapted to be exposed to pressure from fluid located in the bore so as to act against the inner sidewall of the lip to urge it outwardly to enhance sealing of the band against the bore; and
   a second shoulder located on the first tube between the male end and the lip, defining one end of the recess, facing toward the support shoulder and spaced axially from the lip, the shoulder being substantially the same diameter as the lip and slightly less than the diameter of the bore.

2. In a subsea well installation having upper and lower members, each having an aligned bore, a tube having upper and lower ends for insertion into the bores of the upper and lower members, respectively, the tube having a passage threrethrough, means for mounting the tube stationarily to the upper member, an improved seal means located adjacent the upper and lower ends on the tube for sealing to the bores, each seal means comprising in combination:
   an annular metal lip located on the exterior of the tube, the lip having an outer diameter less than the diameter of the lower member bore, except for a radially protruding metal band on the lip which is located on the free end of the lip and which has an outer diameter slightly greater than the inner diameter of the bore, providing an interference fit;
   the lip being spaced radially outward from an exterior portion of the tube by an annular recess, the recess allowing the lip to deflect elastically inward when inserted into the lower member bore, the recess being adapted to be exposed to fluid pressure in the bores to act outwardly on the inside surface of the lip to enhance sealing of the band against the respective bore; and
   the recess extending axially from the free end of the lip a short distance toward the nearest end of the tube, defining a shoulder which faces the free end of the lip and has an outer diameter substantially the same as the diameter of the lip and slightly less than the diameter of the bore of the member into which it is inserted.

* * * * *